(12) United States Patent
Alvin et al.

(10) Patent No.: US 10,817,706 B2
(45) Date of Patent: Oct. 27, 2020

(54) SYSTEM AND METHOD FOR FACILITATING THROUGHPUT USING FACIAL RECOGNITION

(71) Applicant: Universal City Studios LLC, Universal City, CA (US)

(72) Inventors: Andrew Alexander Alvin, Orlando, FL (US); Preston Tyler Jordan, St. Cloud, FL (US)

(73) Assignee: Universal City Studios LLC, Universal City, CA (US)

( * ) Notice: Subject to any disclaimer, the term of this patent is extended or adjusted under 35 U.S.C. 154(b) by 224 days.

(21) Appl. No.: 16/000,447

(22) Filed: Jun. 5, 2018

(65) Prior Publication Data

US 2019/0340422 A1 Nov. 7, 2019

Related U.S. Application Data

(60) Provisional application No. 62/665,272, filed on May 1, 2018.

(51) Int. Cl.
| | |
|---|---|
| *G06K 9/00* | (2006.01) |
| *G06K 9/18* | (2006.01) |
| *G06F 21/40* | (2013.01) |
| *G06F 21/32* | (2013.01) |
| *G06F 16/28* | (2019.01) |

(52) U.S. Cl.
CPC ....... *G06K 9/00288* (2013.01); *G06F 16/288* (2019.01); *G06F 21/32* (2013.01); *G06F 21/40* (2013.01); *G06K 9/00255* (2013.01); *G06K 9/18* (2013.01)

(58) Field of Classification Search
None
See application file for complete search history.

(56) References Cited

U.S. PATENT DOCUMENTS 4,975,969 A * 12/1990 Tal .................... A61B 5/1176
382/116
5,095,196 A * 3/1992 Miyata .................. G07C 9/10
235/382

(Continued)

FOREIGN PATENT DOCUMENTS

KR 20170044841 A 4/2017

OTHER PUBLICATIONS

Warsaw, Poland, "Best Practice Technical Guidelines for Automated Border Control (ABC) Systems", Frontex, Sep. 1, 2015, pp. 1-62.
(Continued)

*Primary Examiner* — Shervin K Nakhjavan
(74) *Attorney, Agent, or Firm* — Fletcher Yoder, P.C.

(57) ABSTRACT

Systems and methods are described that include receiving an indication of a scanned document from a scanning device, waiting a delay period in response to receiving the indication of the scanned document, and instructing an image capture device to capture an image of a document holder after waiting the delay period. In this manner, the described systems and methods may increase facial recognition throughput by waiting the delay period after receiving the indication of the scanned document, allowing for sufficient time for the document holder to look up from the scanning device to the image capture device.

20 Claims, 4 Drawing Sheets

(56) References Cited

U.S. PATENT DOCUMENTS

| | | | | |
|---|---|---|---|---|
| 5,337,358 A * | 8/1994 | Axelrod | G07F 7/08 | 705/75 |
| 6,526,158 B1 * | 2/2003 | Goldberg | H04N 1/00151 | 382/115 |
| 6,591,068 B1 * | 7/2003 | Dietz | H04N 1/00127 | 348/64 |
| 6,810,480 B1 | 10/2004 | Parker et al. | | |
| 7,114,079 B1 * | 9/2006 | Cook | G07C 9/257 | 713/186 |
| 7,284,698 B2 | 10/2007 | Sogo | | |
| 7,542,588 B2 * | 6/2009 | Ekin | G01S 3/7864 | 348/143 |
| 8,189,096 B2 | 5/2012 | Azar et al. | | |
| 8,792,677 B2 | 7/2014 | Kephart | | |
| 8,832,805 B1 * | 9/2014 | McGilliard | H04L 63/104 | 726/5 |
| 2003/0123710 A1 * | 7/2003 | Nakazawa | G07C 9/257 | 382/115 |
| 2004/0151347 A1 * | 8/2004 | Wisniewski | G06K 9/00221 | 382/115 |
| 2005/0129281 A1 * | 6/2005 | Ashizaki | G03H 1/268 | 382/112 |
| 2007/0075827 A1 * | 4/2007 | Itoh | G06F 21/32 | 340/5.53 |
| 2007/0198286 A1 * | 8/2007 | Tomita | G06F 21/32 | 713/182 |
| 2007/0235520 A1 * | 10/2007 | Smith | G06Q 20/042 | 235/379 |
| 2008/0004892 A1 * | 1/2008 | Zucker | G06Q 30/00 | 705/7.28 |
| 2008/0251575 A1 * | 10/2008 | Bowling | G11B 27/034 | 235/375 |
| 2010/0205667 A1 | 8/2010 | Anderson et al. | | |
| 2011/0102854 A1 * | 5/2011 | Cho | G06T 11/60 | 358/403 |
| 2011/0124405 A1 * | 5/2011 | Okada | G07D 7/12 | 463/25 |
| 2012/0019685 A1 * | 1/2012 | Morioka | G11B 27/28 | 348/222.1 |
| 2012/0162436 A1 * | 6/2012 | Cordell | H04N 21/41415 | 348/158 |
| 2012/0176220 A1 * | 7/2012 | Garcia | G09B 7/00 | 340/5.83 |
| 2012/0226600 A1 * | 9/2012 | Dolev | G06K 9/6203 | 705/38 |
| 2012/0278765 A1 * | 11/2012 | Kuwahara | H04N 5/44543 | 715/841 |
| 2012/0293642 A1 * | 11/2012 | Berini | G06F 21/34 | 348/77 |
| 2013/0002399 A1 * | 1/2013 | Frueh | G07C 9/257 | 340/5.53 |
| 2013/0073087 A1 * | 3/2013 | Irmler | B25J 11/0015 | 700/259 |
| 2013/0293720 A1 * | 11/2013 | Tyson | H04N 7/181 | 348/159 |
| 2014/0363057 A1 * | 12/2014 | Eckel | G06Q 50/265 | 382/116 |
| 2015/0125048 A1 * | 5/2015 | Ikenoue | G06K 9/00288 | 382/118 |
| 2015/0281232 A1 * | 10/2015 | Gormley | H04L 9/08 | 713/168 |
| 2016/0063235 A1 | 3/2016 | Tussy | | |
| 2016/0072915 A1 * | 3/2016 | Decanne | G06F 16/24578 | 715/728 |
| 2016/0275518 A1 * | 9/2016 | Bowles | G06K 9/6215 | |
| 2016/0335511 A1 * | 11/2016 | MacDonald | G06F 21/316 | |
| 2017/0161750 A1 * | 6/2017 | Yao | G06K 7/1417 | |
| 2018/0082304 A1 * | 3/2018 | Summerlin | G06Q 20/325 | |
| 2018/0189551 A1 * | 7/2018 | Ranganath | G06K 9/00288 | |
| 2018/0295249 A1 * | 10/2018 | Murakami | G06K 9/00442 | |
| 2019/0057249 A1 * | 2/2019 | Hayase | G06F 21/32 | |
| 2019/0065874 A1 * | 2/2019 | Gerard | G06Q 20/4016 | |
| 2020/0042772 A1 * | 2/2020 | Feng | G06K 9/00288 | |

OTHER PUBLICATIONS

PCT/US2019/020400 Search Report and Written Opinion dated May 23, 2019.

* cited by examiner

SYSTEM AND METHOD FOR FACILITATING THROUGHPUT USING FACIAL RECOGNITION

CROSS REFERENCE TO RELATED APPLICATIONS

This application claims benefit of U.S. Provisional Application Ser. No. 62/665,272, filed May 1, 2018, entitled "System and Method for Facilitating Throughput Using Facial Recognition," which is hereby incorporated by reference in its entirety for all purposes.

BACKGROUND

The present disclosure relates generally to facial recognition. More specifically, embodiments of the present disclosure relate to systems and methods that increase facial recognition throughput when used, for example, in conjunction with assessing an identification code in a document.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many venues, such as theme parks, manage access rights for large groups of visitors. Such venues often utilize traditional queuing systems to control access and manage throughput. For example, traditional paper ticketing systems are often utilized to confirm access rights and to control the number of people admitted to the venue within a particular timeframe. Also, certain traditional techniques involve the use of biometric data, such as fingerprint scanning and facial recognition. It is now recognized that certain systems and techniques can be utilized in conjunction with aspects of traditional techniques to facilitate throughput for queuing procedures.

Authenticating a document and a document holder associated with the document may include scanning an identification code of the document and capturing an image, such as a facial image, of the document holder. In particular, a scanning device may be used to read the identification code of the document, and upon successfully reading the identification code, a camera may capture the image of the document holder. It is now recognized that, while the scanning device is scanning the document to read the identification code, the document holder may look down to, for example, ensure that the identification code is aligned with a sensor of the scanning device. As such, if the scanning device is programmed to (immediately) capture the image of the document holder in response to successfully reading the identification code, then the camera may not accurately capture the image of the document holder. That is, the camera (which may be positioned to capture an appropriate image when the document holder is looking upright) may capture an image of the document holder while the document holder is looking down at the scanning device and away from the camera.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure provides systems and methods that increase facial recognition throughput when used, for example, in conjunction with reading an identification code of a document. In particular, a scanning device may be used to read the identification code of the document (e.g., a ticket, an identification document, a form of payment, or the like). A controller communicatively coupled to the scanning device may receive an indication that the identification code has been successfully read, and wait a delay period (e.g., one second) of time as implemented, for example, by delay logic. The delay period may enable sufficient time for the document holder (e.g., guest, attendee, passenger, etc.) to realize that the identification code has been successfully read and look up (e.g., in the direction of a camera). The controller may then instruct the camera, also communicatively coupled to the controller, to capture the image of the document holder. In this manner, the presently disclosed systems and methods may increase facial recognition throughput by more dependably capturing facial images.

In one embodiment, a system includes a scanning device that reads an identification code of a document and an image capture device that captures an image of a document holder. The system also includes a profile and delay system communicatively coupled to the image capture device and the scanning device. The profile and delay system includes delay logic that generates a delay period of time. The profile and delay system also includes a processor that receives an indication from the scanning device that the identification code has been read. The process also receives the delay period of time from the delay logic, waits the delay period of time, and instructs the image capture device to capture the image of the document holder.

In another embodiment, a profile and delay system includes delay logic that generates a delay period of time. The profile and delay system also includes a processor that receives an indication of a scanned document from a scanning device communicatively coupled to the profile and delay system. The processor also receives the delay period of time from the delay logic, waits the delay period of time, and instructs an image capture device communicatively coupled to the profile and delay system to capture an image of a document holder.

In yet another embodiment, a method includes receiving an indication of a scanned document, waiting a delay period in response to receiving the indication of the scanned document, and instructing an image capture device to capture an image of a document holder after waiting the delay period.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides systems and methods that increase facial recognition throughput by waiting a delay period after receiving an indication that an identification code of a document (e.g., a ticket) has been successfully read and before capturing the image of the document holder's (e.g., guest, attendee, passenger, etc.) face. It should be noted that the document may be a traditional ticket or an electronic ticket displayed on a display on a portable device, such as a barcode displayed on a smartphone screen.

Figure 1:
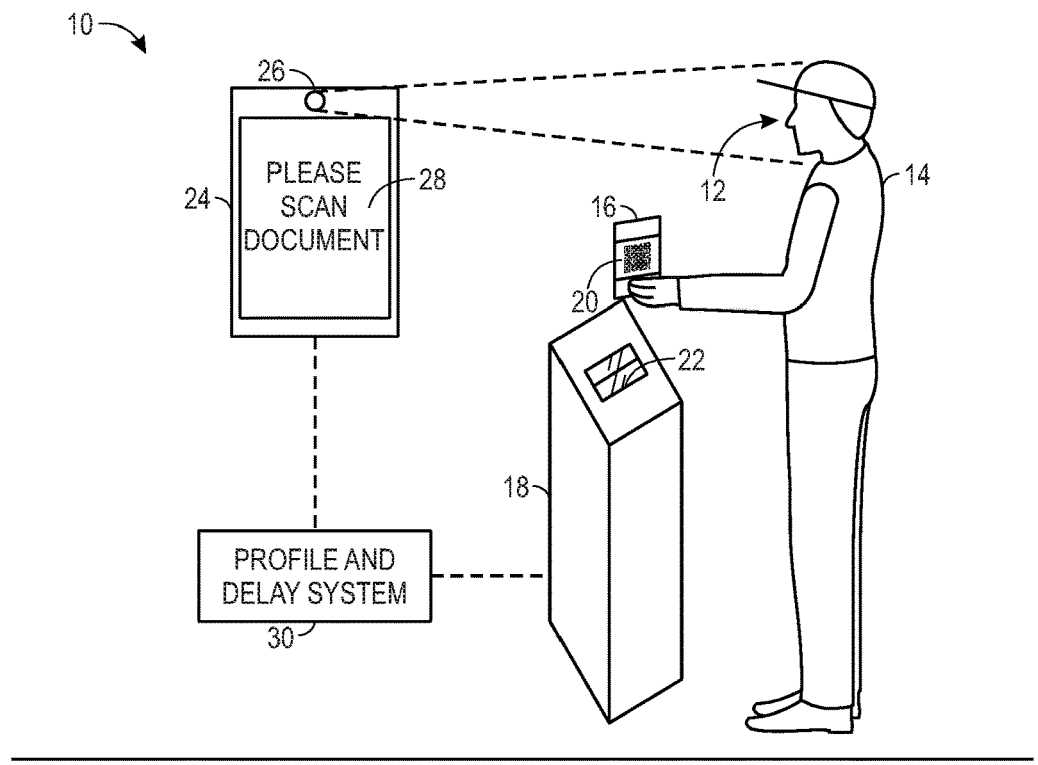
FIG. 1 is a perspective view of a document holder preparing to scan a document using a scanning device of a document authentication and facial recognition system, according to embodiments of the present disclosure.
Figure 2:
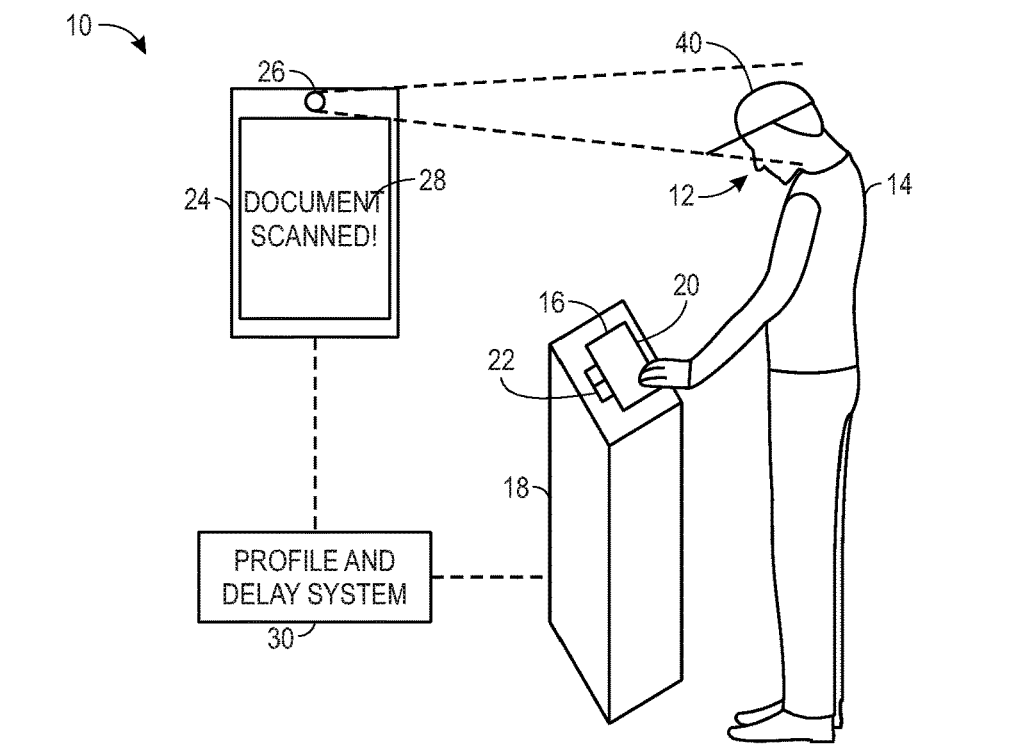
FIG. 2 is a perspective view of the document holder scanning the document using the scanning device of the document authentication and facial recognition system, according to embodiments of the present disclosure.
Figure 3:
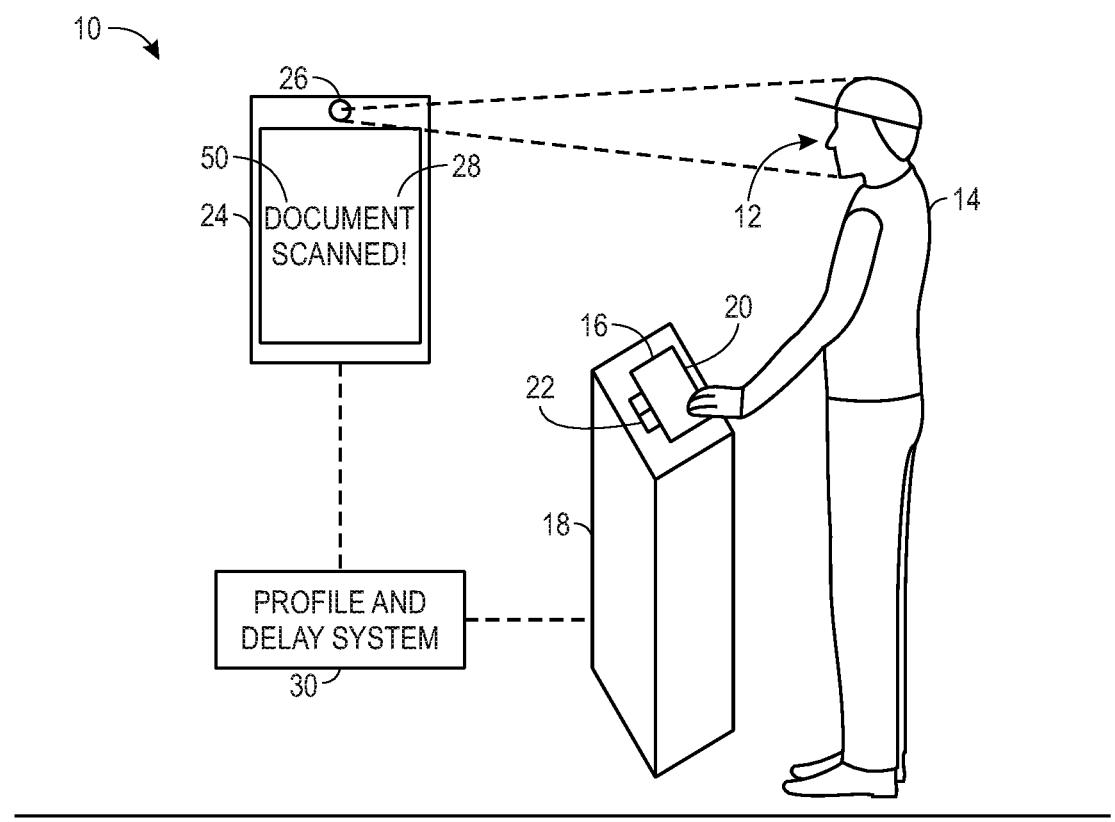
FIG. 3 is a perspective view of the document holder after a delay period has expired after the scanning device of the document authentication and facial recognition system successfully reading an identification code of the document, according to embodiments of the present disclosure.

FIGS. 1-3 are perspective views of a document authentication and facial recognition system 10, according to embodiments of the present disclosure. The document authentication and facial recognition system 10 may capture image data of a face 12 of a document holder 14 after the document holder 14 has initiated reading of an identification code 20 of a document 16 (e.g., successfully scanning of the document 16) by a scanning device 18. The document 16 may be any suitable document that may be scanned, such as a ticket (e.g., an entry ticket, a theme park ticket, an entertainment ticket, a special status pass, and the like), an identification document (e.g., a passport, a driver's license, and the like), a form of payment (e.g., a credit card, a debit card, and the like), and so forth. In particular, the document 16 may provide an entitlement or a credential for the document holder 14 that enables certain privileges (e.g., entry into a theme park or sporting event, access to financial resources, or the like). As such, the document holder 14 may scan the document 16 using the scanning device 18 to gain admission to a theme park, an entertainment venue, a concert, a movie theater, a play, a special level (e.g., a club level or a VIP level) of an event, or the like, to authenticate the document holder's 14 identity, or to pay for a product or service. The scanning device 18 may read the identification code 20 of the document 16 to authenticate the document 16. For example, the scanning device 18 may be any suitable type of identification code reader, such as a barcode reader, Quick Response (QR) code reader, radio frequency identification (RFID) code reader, near field communication tag reader, or the like. As such, the identification code 20 may include any suitable type of identification code, such as a barcode, Quick Response (QR) code, radio frequency identification (RFID) code, near field communication tag, or the like. Moreover, in some embodiments, the document 16 may be an electronic document, and be displayed on the document holder's electronic device, such as a mobile phone (e.g., a smartphone), a tablet computer, a wearable device, or any other suitable device that may display the identification code 20.

The identification code 20 may be aligned with a sensor 22 of the scanning device 18 to enable the scanning device 18 to read the identification code 20. In some embodiments, such as where the identification code 20 is a barcode or a QR code, the scanning device 18 may read elements (e.g., markings) of the identification code 20 by illuminating the identification code 20 with an illumination system (e.g., a red light). Specifically, the sensor 22 of the scanning device 18 may detect reflected light from the illumination system and generate an analog signal that is sent to a decoder. The decoder may interpret the analog signal, validate the identification code 20 (e.g., using a check digit process), and convert the identification code 20 into usable data (e.g., text). Further references to the identification code 20 in the present disclosure may apply to either the physical (e.g., black and white) elements of the identification code 20 printed and/or displayed on the document 16 and/or the associated data (e.g., the converted text) represented and communicated by the identification code 20.

FIG. 1 is a perspective view of the document holder 14 (e.g., guest, attendee, passenger, etc.) preparing to scan the document 16 (e.g., a ticket) using the scanning device 18, according to embodiments of the present disclosure. An image capture device 24 may include a camera 26 to capture the image of the document holder's face 12. As illustrated, the image capture device 24 may be positioned in front of the document holder 14 (and the scanning device 18). In some embodiments, the image capture device 24 may include a display 28. The display 28 may provide instructions to the document holder 14 relating to, for example, following the instructions provided by the display 28, when to scan the document 16, aligning the identification code 20 with the sensor 22, and the like. The image capture device 24 may include any suitable device that may include the camera 26, such as a tablet computer, and the camera 26 may include any suitable device that may capture the image of the document holder's face 12. The image capture device 24, and more particularly the camera 26, may be aimed to an approximate height of the document holder's face 12. In some embodiments, the camera 26 may be on and scanning, but may not be capturing image or video, while the document holder 14 is preparing to scan the document 16 as shown in FIG. 1. A profile and delay system 30 may communicatively couple (via wireless and/or wired connections) the scanning device 18 to the image capture device 24. Details of the profile and delay system 30 are explained below.

FIG. 2 is a perspective view of the document holder 14 scanning the document 16 using the scanning device 18, according to embodiments of the present disclosure. To read the identification code 20, the identification code 20 may be aligned with the sensor 22 of the scanning device 18. As such, the document holder 14 may look down at the sensor 22 and/or the scanning device 18 to ensure that the identification code 20 is aligned with the sensor 22. The sensor 22 may then successfully read the identification code 20 upon alignment between the sensor 22 and the identification code 20. In some conventional systems, the image capture device 24 may be instructed to (immediately) capture an image of the document holder's face 12 using the camera 26 in response to the scanning device 18 successfully reading the identification code 20. In some embodiments, the display 28 of the image capture device 24 may indicate that the document 16 has been successfully read. However, because the image capture device 24 is positioned in front of the document holder 14, and because the document holder 14 may still be looking down at the sensor 22 and/or the scanning device 18 (e.g., to ensure that the identification code 20 is aligned with the sensor 22), the image capture device 24 may not capture a good, valid, and/or adequate representation of the document holder's face 12 due to attempting to immediately capture the image of the document holder's face. As illustrated in FIG. 2, the image capture device 24 may instead capture an image of the top of the document holder's head 40.

FIG. 3 is a perspective view of the document holder 14 after a delay period has expired after successfully reading the identification code 20, according to embodiments of the present disclosure. The delay period may be any suitable period of time sufficient to enable the document holder 14 to look up at the image capture device 24 after the identification code 20 is successfully read. The delay period may be provided by the profile and delay system 30. In some embodiments, after successfully reading the identification code 20, the image capture device 24 and/or the scanning device 18 may indicate that the identification code 20 has been successfully read. For example, the display 28 of the image capture device 24 may provide a visual indication 50 that the identification code 20 has been successfully read (or that the document 16 has been successfully scanned). In some embodiments, the scanning device 18 may provide an audio indication that the identification code 20 has been successfully read, for example, by providing a beep or playing an audio clip of a voice saying "Your document has been successfully scanned." Additionally or alternatively, the scanning device 18 may provide a visual and/or audio indication that the identification code 20 has been successfully read. For example, the scanning device 18 may include a display (e.g., an LCD or LED display) that provides text indicating the identification code 20 has been successfully read. The document holder 14, after receiving an indication that the identification code 20 has been successfully read, may look up in the direction of the image capture device 24 (e.g., to move forward and/or to receive further directions from the image capture device 24).

The delay period may correspond to the time it takes for the document holder 14 to look up in the direction of the image capture device 24. The image capture device 24 may then capture an image of the document holder's face 12. The image of the document holder's face 12 may then be used to authenticate the document holder 14 via facial recognition techniques when the document holder 14 subsequently uses (e.g., scans) the document 16 or the identification code 20, e.g., to prevent fraudulent transactions, unauthorized resale of the document to an unauthorized individual, and the like. In this manner, the document authentication and facial recognition system 10 may thus increase facial recognition throughput by waiting the delay period, after receiving an indication that the identification code 20 has been successfully read, and before attempting to capture the image of the document holder's face 12.

Figure 4:
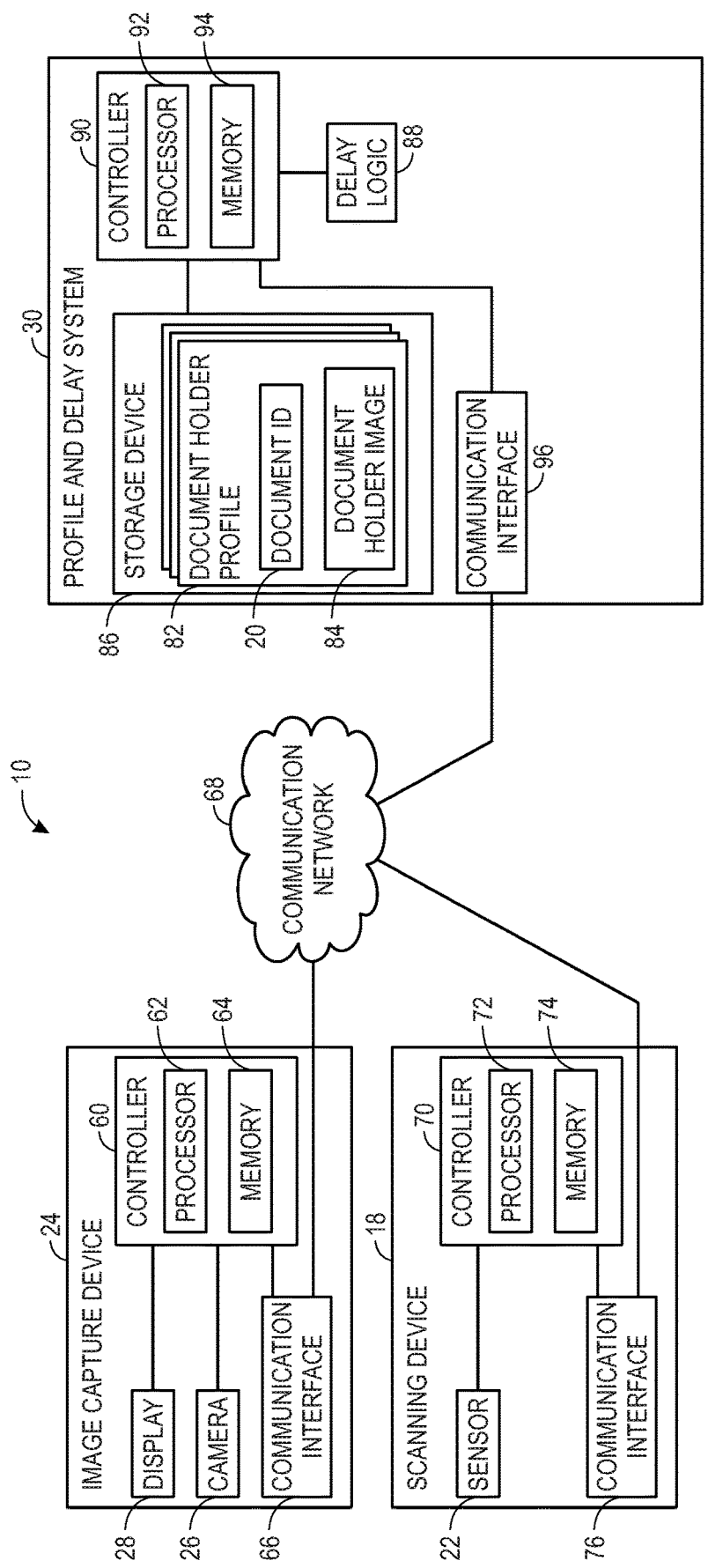
FIG. 4 is a block diagram of the document authentication and facial recognition system of FIGS. 1-3, according to embodiments of the present disclosure.

FIG. 4 is a block diagram of the document authentication and facial recognition system 10 of FIGS. 1-3, according to embodiments of the present disclosure. As discussed above with respect to FIGS. 1-3, the document authentication and facial recognition system 10 may include the image capture device 24. The image capture device 24 may include the camera 26 that may capture an image of the document holder's face 12. In some embodiments, the image capture device 24 may include the display 28 that may provide instructions to the document holder 14. The image capture device 24 may also include a controller 60 that controls the image capture device 24. The controller 60 may include a processor 62 that executes instructions to control the image capture device 24 (e.g., based on input from the scanning device 18), and a memory 64 that stores the instructions. The image capture device 24 may also include a communication interface 66 that enables the image capture device 24 to communicate with other devices, such as the scanning device 18, via a communication network 68. Details regarding the processor 62, the memory 64, the communication interface 66, and the communication network 68 are discussed below.

Also as discussed above with respect to FIGS. 1-3, the document authentication and facial recognition system 10 may include the scanning device 18, which includes the sensor 22 that enables the scanning device 18 to read the identification code 20 of the document 16. The scanning device 18 may also include a controller 70 that controls the scanning device 18. The controller 70 may include a processor 72 that executes instructions to control the scanning device 18, and a memory 74 that stores the instructions. The scanning device 18 may also include a communication interface 76 that enables the scanning device 18 to communicate with other devices, such as the image capture device 24, via the communication network 68. Details regarding the processor 72, the memory 74, and the communication interface 76, are discussed below.

The document authentication and facial recognition system 10 may also include the profile and delay system 30 that generates and/or stores document holder profiles 82 that associate a document's identification code 20 or document identifier ("Document ID") with the image of the corresponding document holder's face 12 or the document holder image 84. The profile and delay system 30 may be implemented as one or more computing devices, such as one or more desktop computers, personal computers, laptop computers, servers, tablet computers, mobile devices, smartphones, wearable devices, and the like. In particular, the profile and delay system 30 may include a storage device 86 that stores the document holder profiles 82. The profile and delay system 30 may also include delay logic 88 that generates and/or provides the delay period sufficient to enable the document holder 14 to look up at the image capture device 24 after scanning the document 16 to provide a good, valid, and/or adequate representation of the document holder's face 12. For example, the delay period may be between 0.1 and 10 seconds, 0.25 and 5 seconds, 0.5 and 3 seconds, and the like, such as approximately 1 second. The delay logic 88 may be in the form of hardware (e.g., circuitry), software (e.g., data or computer instructions), or a combination of both. The profile and delay system 30 may also include a controller 90 that controls the profile and delay system 30. The controller 90 may include a processor 92 that executes instructions to control the profile and delay system 30, and a memory 94 that stores the instructions. The profile and delay system 30 may also include a communication interface 96 that enables the profile and delay system 30 to communicate with other devices, such as the image capture device 24 and the scanning device 18, via the communication network 68. Details regarding the storage device 86, the processor 92, the memory 94, and the communication interface 96, are discussed below.

In some embodiments, the delay period generated by the delay logic 88 may be adjusted or tuned based on successful and unsuccessful attempts by the image capture device 24 to capture facial images of document holders. For example, the profile and delay system 30 may include artificial intelligence logic that may track successful and unsuccessful attempts to capture facial images with desired characteristics (e.g., a sufficient representation of the document holder's face 12). The artificial intelligence logic may adjust or tune the delay period, as provided by the delay logic 88, to increase success over time. For example, there may be a threshold rate (e.g., percentage, ratio, or the like) of successful attempts to capture facial images of document holders that is considered to be sufficient. If the rate of successful attempts to capture facial images of document holders is insufficient, the artificial intelligence logic may increase or decrease the delay period. In such circumstances, the threshold rate of successful attempts to be considered sufficient and the amount of time to increase the delay period may be set by default, set by a user, and/or learned by the artificial intelligence logic. Moreover, in some cases, if the rate of successful attempts is greater than the threshold rate of successful attempts considered to be sufficient, the artificial intelligence logic may decrease the delay logic to decrease wait time for the document holders 14. For example, there may be a threshold delay period that may be deemed excessive (e.g., too long for a document holder 14 to wait), and if the rate of successful attempts is greater than the threshold rate of successful attempts considered to be sufficient, and if the delay period is greater than the threshold delay period, the artificial intelligence logic may decrease the delay period. In some embodiments, the artificial intelligence logic may include hardware (e.g., circuitry) that is part of the profile and delay system 30 (e.g., part of the processor 92) and/or software (e.g., instructions) that are part of the profile and delay system 30 (e.g., part of the memory 94). In this manner, the profile and delay system 30 may increase facial recognition throughput by waiting the delay period after receiving an indication of the scanned document 16 and before capturing the image of the document holder's face 12.

As discussed above, each of the image capture device 24, the scanning device 18, and the profile and delay system 30 may include a respective controller 60, 70, 90 that includes one or more respective processors 62, 72, 92 and one or more respective memory devices 64, 74, 94. The processors 62, 72, 92 (e.g., microprocessors) may execute software programs and/or instructions relating to reading document identifiers 20, capturing images 84 of document holders' faces 12, and/or associating the document identifiers 20 with the images 84. Moreover, the processors 62, 72, 92 may include multiple microprocessors, one or more "general-purpose" microprocessors, one or more special-purpose microprocessors, and/or one or more application specific integrated circuits (ASICS), or some combination thereof. For example, the processors 62, 72, 92 may include one or more reduced instruction set (RISC) processors. The memory devices 64, 74, 94, as well as the storage device 86, may store information such as control software, look up tables, configuration data, and so forth. In some embodiments, the processors 62, 72, 92, the memory devices 64, 74, 94, and/or the storage device 86 may be external to the respective controllers 60, 70, 90. Each of the memory devices 64, 74, 94 and the storage device 86 may include a tangible, non-transitory, machine-readable-medium, such as a volatile memory (e.g., a random access memory (RAM)) and/or a nonvolatile memory (e.g., a read-only memory (ROM)). Each of the memory devices 64, 74, 94 and the storage device 86 may include one or more storage devices (e.g., nonvolatile storage devices) that may include read-only memory (ROM), flash memory, a hard drive, and/or any other suitable optical, magnetic, or solid-state storage medium.

The memory devices 64, 74, 94 and the storage device 86 may store a variety of information and may be used for various purposes. For example, the memory devices 64, 74, 94 and the storage device 86 may store machine-readable and/or processor-executable instructions (e.g., firmware or software) for the processors 62, 72, 92 to execute, such as instructions relating to reading document identifiers 20, capturing images 84 of document holder faces 12, and/or associating the document identifiers 20 with the images 84.

Each of the image capture device 24, the scanning device 18, and the profile and delay system 30 may also include a respective communication interface 66, 76, 96 communicatively coupled to the respective controllers 60, 70, 90 that enables the respective controllers 60, 70, 90 to communicate with any suitable communication network, including the communication network 68. For example, the communication network 68 may include a wireless network (e.g., mobile, WiFi, LAN, WAN, Internet, and the like), and the communication interfaces 66, 76, 96 may enable the respective controllers 60, 70, 90 to communicate with the communication network 68. In this manner, the communication interfaces 66, 76, 96 may enable the controllers 60, 70, 90 to communicate with each other.

Figure 5:
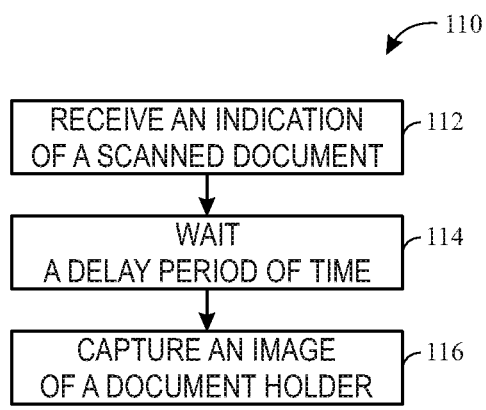
FIG. 5 is a flowchart of a process for increasing facial recognition throughput using the document authentication and facial recognition system of FIGS. 1-3, according to embodiments of the present disclosure.

FIG. 5 is a flowchart of a process 110 for increasing facial recognition throughput using the document authentication and facial recognition system 10 of FIGS. 1-3, according to embodiments of the present disclosure. The process 110 may be in the form of a software application that includes instructions that are executed by at least one suitable processor of the document authentication and facial recognition system 10, such as at least one of the processors 62, 72, 92. The illustrated process 110 is merely provided as an example, and in other embodiments, certain illustrated steps of the process 110 may be performed in other orders, skipped, or repeated, in accordance with the present disclosure.

As illustrated, in process block 112, the processor 92 of the profile and delay system 30 may receive an indication of a scanned document 16 (or a successfully read identification code 20). In particular, the scanning device 18 may scan the document 16 or successfully read the identification code 20 when the document holder 14 aligns the identification code 20 with the sensor 22 of the scanning device 18. The processor 72 of the scanning device 18 may then send an indication that the document 16 was scanned or that the identification code 20 was successfully read to the communication network 68 using the communication interface 76. The processor 92 of the profile and delay system 30 may then receive the indication of the scanned document 16 from the communication network 68 using the communication interface 96.

In process block 114, the processor 92 of the profile and delay system 30 may wait a delay period of time. In particular, the delay logic 88 may generate and/or provide the delay period to the processor 92. The processor 92 may then wait the delay period of time. Specifically, the processor 92 may not send an instruction to capture an image of the document holder 14 during the delay period. In some embodiments, the delay logic 88 may indicate when the instruction to capture the image of the document holder 14 may be sent to the image capture device 24.

In process block 116, after waiting the delay period, the processor 92 of the profile and delay system 30 may instruct the image capture device 24 to capture an image of the document holder 14. In particular, the delay period may be a sufficient time period to enable the document holder 14 to look up at the image capture device 24 after scanning the document 16 to provide a good, valid, and/or adequate representation of the document holder's face 12, but not so long that the document holder 14 may again not be facing the image capture device 24. As such, the processor 92 may send an instruction to the communication network 68 using the communication interface 96 for the image capture device 24 to capture an image of the document holder 14, and more specifically, the document holder's face 12. The processor 62 of the image capture device 24 may receive the instruction from the communication network 68 using the communication interface 66, and then instruct the camera 26 to capture the image of the document holder's face 12. Because the delay period enables the document holder 14 to look up at the image capture device 24 after scanning the document 16, the captured image may provide a good, valid, and/or adequate representation of the document holder's face 12. In this manner, the process 110 may increase facial recognition throughput by waiting the delay period after receiving an indication of the scanned document 16 and before capturing the image of the document holder's face 12.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for increasing facial recognition throughput comprising:
   a scanning device configured to read an identification code of a document;
   an image capture device separate form the scanning device, the image capture device configured to capture an image of a document holder; and
   a profile and delay system communicatively coupled to the image capture device and the scanning device, wherein the profile and delay system comprises a processor and a memory, the memory storing instructions that, when executed, cause the processor to:
      receive an indication from the scanning device that the identification code has been read;
      in response to receiving the indication from the scanning device that the identification code has been read, wait a delay period of time to enable the document holder to look up from the scanning device to the image capture device separate from the scanning device; and
      instruct the image capture device to capture the image of the document holder, wherein the image of the document holder is configured to be used to authenticate the document holder using facial recognition.

2. The system of claim 1, wherein the scanning device comprises an identification code reader, wherein the identification code reader is configured to read the identification code of the document.

3. The system of claim 1, wherein the document is configured to provide the document holder access to an entitlement or credential.

4. The system of claim 3, wherein the document comprises an entry ticket, wherein the entitlement or credential comprises entry into a theme park.

5. The system of claim 1, wherein the image capture device comprises a display, wherein the display is configured to instruct the document holder to use the scanning device to read the identification code.

6. The system of claim 1, wherein the profile and delay system comprises a storage device, wherein the storage device is configured to store a plurality of document holder profiles.

7. The system of claim 6, wherein a document holder profile of the plurality of document holder profiles comprises:
   the identification code; and
   the image of the document holder.

8. The system of claim 1, wherein the profile and delay system is communicatively coupled to the image capture device and the scanning device via a communication network.

9. The system of claim 1, wherein the delay period is configured to provide sufficient time for the document holder to look at the image capture device after the scanning device reads the identification code.

10. The system of claim 1, wherein the delay period is between 0.5 and 3 seconds.

11. The system of claim 1, wherein the processor is configured to adjust the delay period based on a rate of successful attempts to capture images of document holders.

12. A profile and delay system for increasing facial recognition throughput comprising:
   a processor and a memory, wherein the memory is configured to store instructions that, when executed, cause the processor to:
      receive an indication of a scanned document from a scanning device communicatively coupled to the profile and delay system;
      in response to receiving the indication of the scanned document, wait a delay period of time to enable a document holder to look up from the scanning device to an image capture device separate from the scanning device; and
      instruct the image capture device communicatively coupled to the profile and delay system and separate from the scanning device to capture an image of the document holder, wherein the image of the document holder is configured to be used to authenticate the document holder using facial recognition.

13. The profile and delay system of claim 12, wherein the scanned document comprises a ticket, an identification document, or a form of payment.

14. The profile and delay system of claim 12, comprising a storage device, wherein the storage device is configured to store a plurality of document holder profiles.

15. The profile and delay system of claim 14, wherein the scanned document comprises a document identifier, wherein a document holder profile of the plurality of document holder profiles comprises:
   the document identifier; and
   the image of the document holder.

16. The profile and delay system of claim 12, wherein the image capture device and the scanning device are communicatively coupled to the profile and delay system via a communication network.

17. A method for increasing facial recognition throughput comprising:
   receiving an indication of a scanned document from a scanning device;
   waiting a delay period in response to receiving the indication of the scanned document from the scanning device to enable a document holder to look up from the scanning device to an image capture device separate from the scanning device; and instructing the image capture device separate from the scanning device to capture an image of the document holder after waiting the delay period, wherein the image of the document holder is configured to be used to authenticate the document holder using facial recognition.

18. The method of claim 17, comprising:

receiving an identifier of the scanned document; and receiving the image of the document holder.

19. The method of claim 18, comprising:

storing the identifier in a storage device;

storing the image of the document holder in the storage device; and associating the identifier with the image of the document holder.

20. The method of claim 17, comprising adjusting the delay period based on a rate of successful attempts to capture images of document holders.

* * * * *